(12) United States Patent
Lin

(10) Patent No.: US 8,531,666 B2
(45) Date of Patent: Sep. 10, 2013

(54) METHOD FOR POSITIONING VIEWING CENTER OF PARALLAX BARRIER

(75) Inventor: Ming-Yen Lin, Taipei (TW)

(73) Assignee: Unique Instruments Co. Ltd, Taipei (TW)

( * ) Notice: Subject to any disclaimer, the term of this patent is extended or adjusted under 35 U.S.C. 154(b) by 391 days.

(21) Appl. No.: 12/945,189

(22) Filed: Nov. 12, 2010

(65) Prior Publication Data

US 2011/0109916 A1    May 12, 2011

(30) Foreign Application Priority Data

Nov. 12, 2009   (TW) .............................. 98138470 A

(51) Int. Cl.
 *G01B 11/00*     (2006.01)
(52) U.S. Cl.
 USPC ............ 356/400; 356/614; 359/463; 359/639
(58) Field of Classification Search
 USPC .......................................... 356/399–401, 615
 See application file for complete search history.

(56) References Cited

U.S. PATENT DOCUMENTS

| | | | |
|---|---|---|---|
| 6,556,261 B1 * | 4/2003 | Krusius et al. .................. | 349/73 |
| 2009/0080099 A1 * | 3/2009 | Tanimoto et al. ............. | 359/893 |
| 2010/0182686 A1 * | 7/2010 | Fukushima et al. .......... | 359/463 |
| 2010/0220325 A1 * | 9/2010 | Otte et al. ..................... | 356/400 |

FOREIGN PATENT DOCUMENTS

| | | | |
|---|---|---|---|
| TW | 098128986 | | 8/2010 |
| WO | PCT/DE08/00925 | * | 12/2008 |

* cited by examiner

*Primary Examiner* — Gregory J Toatley
*Assistant Examiner* — Rebecca C Bryant
(74) *Attorney, Agent, or Firm* — WPAT, PC; Justin King

(57) ABSTRACT

A method for positioning a viewing center of a parallax barrier mainly includes: disposing multiple alignment markers respectively at appropriate places of the parallax barrier and a flat panel display, and performing position measurement and alignment of the multiple alignment markers, so as to achieve a purpose of setting a viewing center at a specific and appropriate position.

13 Claims, 21 Drawing Sheets

| P(mm) | B₀(mm) | L_E(mm) | m | ΔB(mm) | ΔC(mm) |
|---|---|---|---|---|---|
| 0.1 | 0.0998855 | 68.9 | 0.14400 | 0.014379 | 9.921600 |
| 0.1 | 0.0998855 | 68.9 | 0.07200 | 0.007190 | 4.960800 |
| 0.05 | 0.0049964 | 69.4 | 0.14500 | 0.007245 | 10.063000 |
| 0.05 | 0.0049964 | 69.4 | 0.07250 | 0.003622 | 5.031500 |

FIG. 11

METHOD FOR POSITIONING VIEWING CENTER OF PARALLAX BARRIER

BACKGROUND OF THE INVENTION

1. Field of Invention

The present invention relates to a method for positioning a viewing center of a parallax barrier, which mainly includes: disposing multiple alignment markers respectively at appropriate places of the parallax barrier and a flat panel display, and performing the position measurement and alignment of multiple alignment markers, so as to achieve a purpose of setting a viewing center at a specific and appropriate position.

2. Related Art

FIG. 1 is a schematic view of a structure and viewing of a conventional parallax barrier 3D display. The parallax barrier 3D image display 10 is mainly formed of a flat panel display screen 11 and a parallax barrier 12. The parallax barrier 12 may be a conventional vertical strip parallax barrier, a conventional slant-and-strip parallax barrier, or a conventional slant-and-step parallax barrier. A coordinate system (X, Y, Z) is set, an XY plane thereof is disposed on a surface of the flat panel display screen 11, and an origin (0,0,0) thereof is disposed at a reference point position $C_S$ of the flat panel display screen 11. The reference point position $C_S$ may be set at the center of the flat panel display screen 11, or a position close to that center. The parallax barrier 12 is disposed at a position of $Z=L_B$. Likewise, a reference point position $C_B$ is also set on the plane of the parallax barrier 12. The reference point position $C_B$ may be set at the center of the flat panel display screen 11, or a position close to that center. Thus, a 3D image can be viewed at an optimum viewing distance $Z_0$, and at optimum viewing point $P_L$ and $P_R$. Those two optimum viewing points $P_L$ and $P_R$ are the viewing positions of left and right eyes 13 and 14 of a viewer. A distance between the two optimum viewing points $P_L$ and $P_R$ is an optimum viewing interval $L_V$. In design, the optimum viewing interval $L_V$ is generally equal to the interpupillary distance (IPD) $L_E$. Additionally, the center between the two optimum viewing points $P_L$ and $P_R$ defines a viewing center $C_E$. Details relevant to the principle and design of a parallax barrier can refer to ROC Patent No. 098128986.

Generally, during practical manufacturing, assembly, and mass production, only when the disposed position between the flat panel display screen 11 and the parallax barrier 12 is particularly positioned and aligned, the viewing center $C_E$ can be fixed at a specific and appropriate position.

FIG. 2 to FIG. 5 are schematic views of a viewing center of a parallax barrier with multi-view 3D image.

FIG. 2 is a schematic view of a viewing center of a parallax barrier with 2-view 3D image. The 2-view image is formed of multiple basic units of combined view 21. Each of the basic units of combined view 21 consists of the individual view images 0 and 1 being arranged sequentially from left to right in a unit of a pixel or sub-pixel. There exist multiple optimum viewing points P(1) and P(0) at the optimum viewing distance $Z_0$ for viewing a 3D image. Additionally, due to a relation of even number symmetry, a reference point position $C_S$ of the flat panel display screen 11 is just located between the view images 0 and 1, that is, the center position of the basic unit of combined view 21. Thus, for setting of the reference point position $C_S$ of the flat panel display screen 11, the optimum position can be set at the center of the basic unit of combined view 21, and the basic unit of combined view 21 is characterized in being the closest to the geometrical center of the flat panel display screen 11. That is to say, the $C_S$ can be disposed at the geometrical center of the flat panel display screen or a position close to the center of the flat panel display screen.

FIG. 3 is a schematic view of a viewing center of a parallax barrier with 4-view 3D image. The 4-view image is formed of multiple basic units of combined view 22. Each of the basic units of combined view 22 consists of the individual view images 0, 1, 2, and 3 being arranged sequentially from left to right in a unit of a pixel or sub-pixel. There exist multiple optimum viewing points P(3), P(2), P(1), and P(0) at an optimum viewing distance $Z_0$ for viewing a 3D image. Additionally, due to a relation of even number symmetry, a reference point position $C_S$ of the flat panel display screen 11 is just located between the view images 1 and 2, that is, the center of the basic unit of combined view 22. Thus, for setting of the reference point position $C_S$ of the flat panel display screen 11, the optimum position can be set at the center of the basic unit of combined view 22, and the basic unit of combined view 22 is characterized in being the closest to the geometrical center of the flat panel display screen 11. That is to say, the $C_S$ can be disposed at the geometrical center point of the flat panel display screen or a position close to the center of the flat panel display screen.

For display of an even number-view 3D image as shown in FIG. 2 to FIG. 3, on the XY plane, when the plane of the parallax barrier 12 and the plane of the flat panel display screen 11 are in a state of being plane-parallel without angle rotation, and the reference point position $C_B$ of the parallax barrier 12 is consistent with the $C_S$, that is, both the $C_B$ and the $C_S$ are at a position of the origin (0,0) on the XY plane, the viewing center $C_E$ can also be consistent with the $C_S$, that is, the $C_E$ is also at the position of the origin (0,0) on the XY plane. Thus, the viewer can view the 3D image at the central position of the screen. Additionally, the $C_B$ refers to the geometrical center of the plane of the parallax barrier 12, or a position close to the center, and the position is a center of an opening part of the parallax barrier.

FIG. 4 is a schematic view of a viewing center of a parallax barrier with 3-view 3D image. The 3-view image is formed of multiple basic units of combined view 23. Each of the basic units of combined view 23 consists of the individual view images 0, 1, and 2 being arranged sequentially from left to right in a unit of a pixel or sub-pixel. There exist multiple optimum viewing point P(2), P(1), and P(0) at an optimum viewing distance $Z_0$ for viewing a 3D image. Additionally, due to a relation of odd number symmetry, a reference point position $C_S$ of the flat panel display screen 11 is just located at the center of the view image 1, that is, the center of the basic unit of combined view 23. Thus, for setting of the reference point position $C_S$ of the flat panel display screen 11, the optimum position can be set at the center of the basic unit of combined view 23, and the basic unit of combined view 23 is characterized in being the closest to a geometrical center of the flat panel display screen 11. That is to say, the $C_S$ can be disposed at the geometrical center of a plane of the flat panel display screen or a position close to the plane of the center of the flat panel display screen.

FIG. 5 is a schematic view of a viewing center of a parallax barrier with 5-view 3D image. The 5-view image is formed of multiple basic units of combined view 24. Each of the basic units of combined view 24 consists of the individual view images 0, 1, 2, 3, and 4 being arranged sequentially from left to right in a unit of a pixel or sub-pixel. There exist multiple optimum viewing point P(4), P(3), P(2), P(1), and P(0) at the optimum viewing distance $Z_0$ for viewing a 3D image. Additionally, due to a relation of odd number symmetry, a reference point position $C_S$ of the flat panel display screen 11 is just located at a center of the view image 2, that is, a center of the basic unit of combined view 24. Thus, for setting of the reference point position $C_S$ of the flat panel display screen 11, the optimum position can be set at a center of the basic unit of combined view 24, and the basic unit of combined view 24 is characterized in being the closest to the geometrical center of the flat panel display screen 11. That is to say, the $C_S$ can be disposed at the geometrical center of a plane of the flat panel display screen or a position close to the center of the plane of the flat panel display screen.

For display of an odd number-view 3D image as shown in FIG. 4 to FIG. 5, on the XY plane, when the reference point position $C_B$ of the parallax barrier 12 is consistent with the $C_S$, in an X-axis direction, the viewing center $C_E$ is deviated a distance of $L_E/2$ from the $C_S$, that is, is deviated the distance of $L_E/2$ to the left or to the right. Thus, the viewer cannot view the 3D image at the central position of the screen. Additionally, the reference point position $C_B$ refers to the geometrical center of the plane of the parallax barrier 12, or a position close to the center, and the position is a center of an opening part of the parallax barrier.

The more detailed definitions for the reference point position $C_B$ of the parallax barrier 12 and the opening part of the parallax barrier are as shown in FIG. 6 to FIG. 8. The conventional vertical strip, slant-and-strip, or slant-and-step parallax barrier is formed of light-transmissive elements 15 and shielding elements 16. The opening part herein refers to a light-transmissive element 15 of the parallax barrier. Thus, on the plane of the parallax barrier 12, the reference point position $C_B$ must be set on the center of the light-transmissive element 15 of the parallax barrier, and the position is the geometrical center of the plane of the parallax barrier 12, or close to the center of the plane of the parallax barrier 12.

In view of the above, as shown in FIG. 2 to FIG. 5, only when the reference point position $C_B$ of the parallax barrier 12 is consistent with the reference point position $C_S$ of the flat panel display screen 11, the viewing center $C_E$ can be fixed at a specific and appropriate position. For display of an even number-view 3D image, on the XY plane, due to a relation of even number symmetry, the viewer can view the 3D image at the central position of the screen, that is, the viewing center $C_E$ is consistent with the reference point position $C_S$ of the flat panel display screen 11; while for display of an odd number-view 3D image, on the XY plane, due to a relation of odd number symmetry, the viewer cannot view the 3D image at the central position of the screen, and only after deviating the distance of $L_E/2$ to the left or to the right relative to the screen center, the viewer can view the 3D image, that is, the viewing center $C_E$ is deviated the distance of $L_E/2$ from the reference point position $C_S$ of the flat panel display screen 11. However, for the foregoing ideal state, due to the insufficient assembly and positioning precision, when the reference point position $C_B$ of the parallax barrier 12 is inconsistent with the reference point position $C_S$ of the flat panel display screen 11, the viewing center is deviated. Additionally, due to the insufficient assembly and repetition accuracy, during the mass production, the viewing center may easily become inconsistent, and cause a low product quality.

SUMMARY OF THE INVENTION

To solve the problem of assembly and positioning of the reference point position $C_B$ of the parallax barrier and the reference point position $C_S$ of the flat panel display screen, the present invention provides a method for positioning a viewing center of a parallax barrier, which mainly comprises: disposing a reference point and multiple alignment markers respectively at appropriate places of the parallax barrier and a flat panel display element, and performing the position measurement and alignment of multiple alignment markers, so as to achieve a purpose of setting a viewing center at a specific and appropriate position.

BRIEF DESCRIPTION OF THE DRAWINGS

The present invention will become more fully understood from the detailed description given herein below for illustration only, and thus are not limitative of the present invention, and wherein:

FIG. 11 shows calculated values of $L_E$, ΔB, and ΔC;

DETAILED DESCRIPTION OF THE INVENTION

For the deviation of the viewing center generated when the reference point position of the parallax barrier is inconsistent with the reference point position of the flat panel display screen, firstly, a displacement of a viewing center is calculated according to theories. For the convenience of illustration with the accompanying drawings, hereinafter, display of a 2-view 3D image is illustrated as an example.

Figure 1:
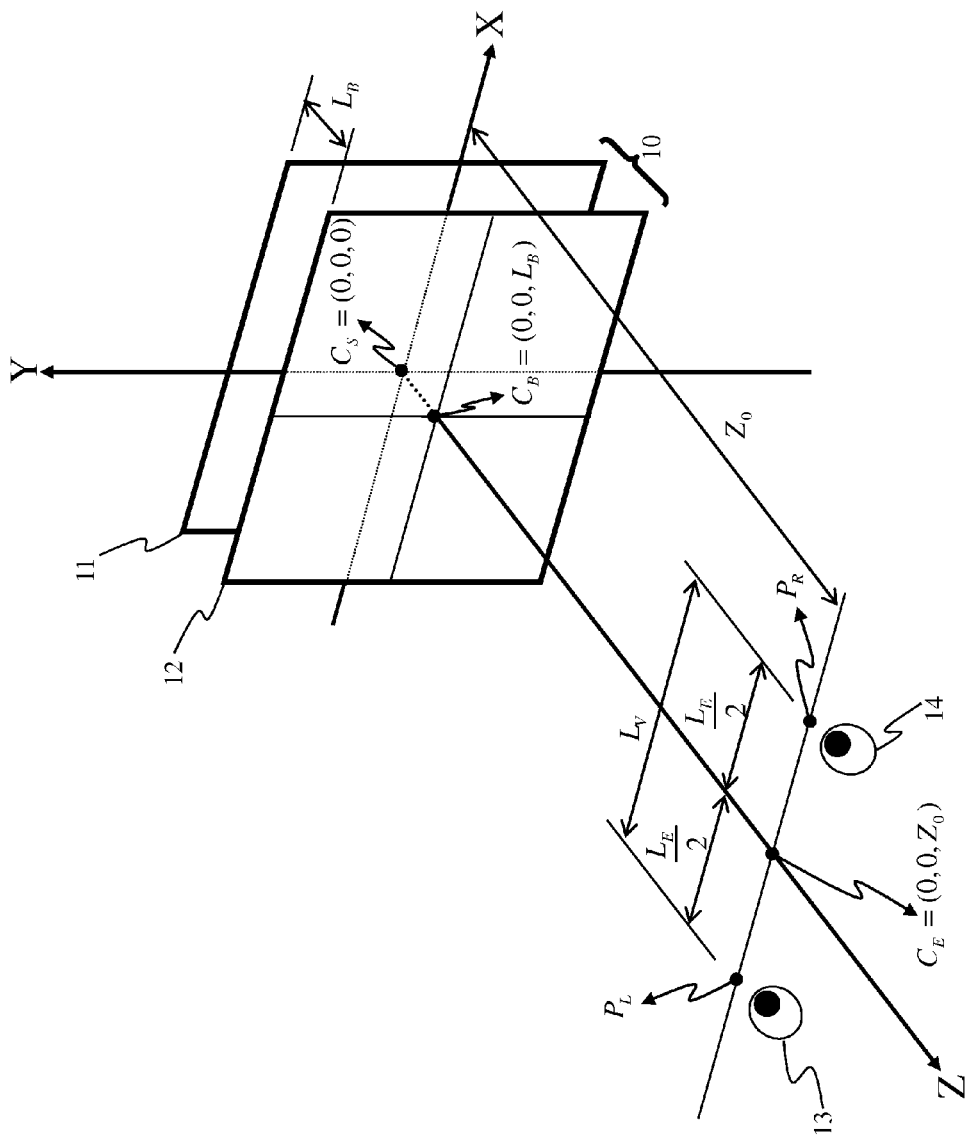
FIG. 1 is a schematic view of a structure and viewing of a conventional parallax barrier 3D display.
Figure 2:
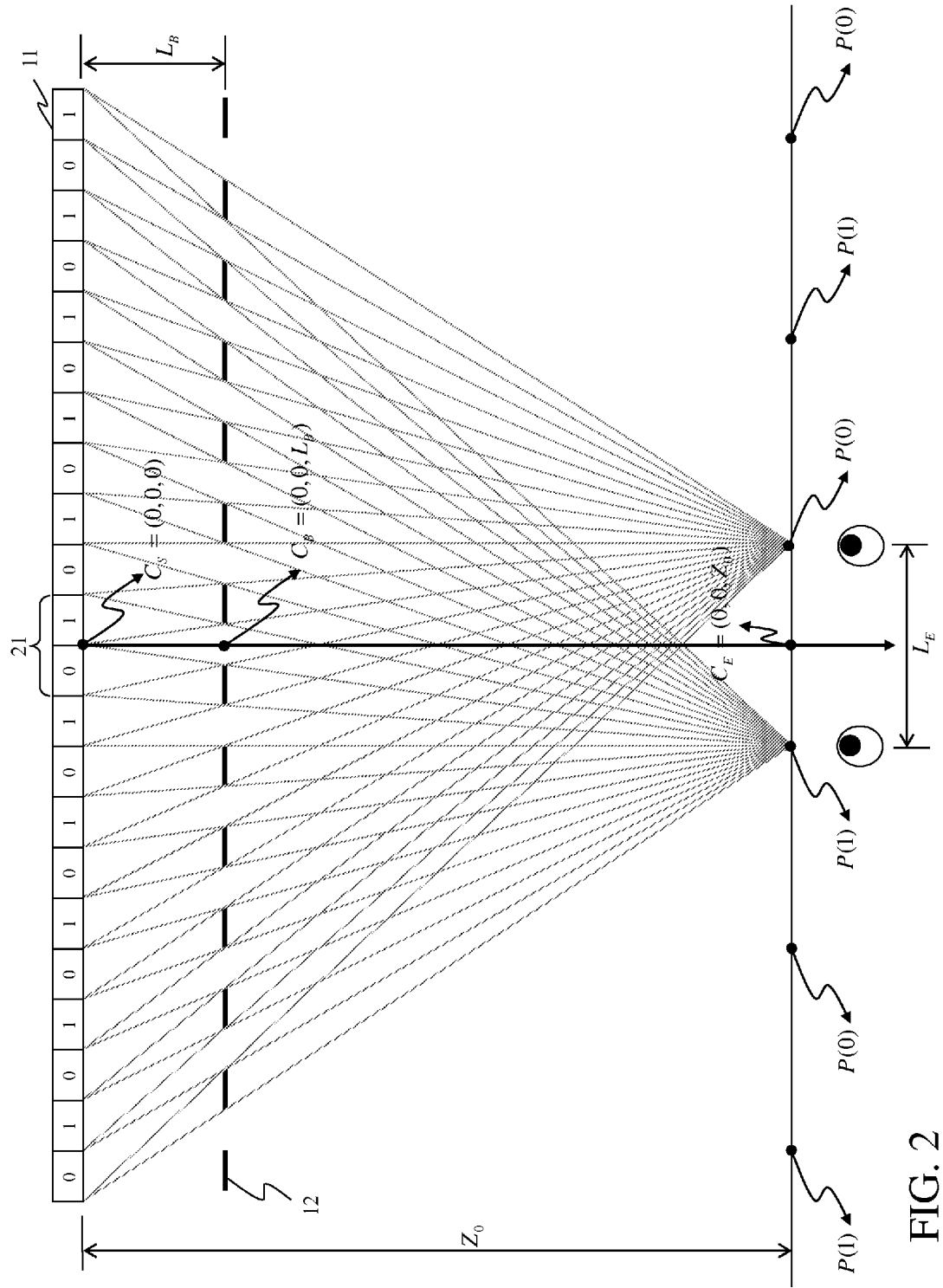
FIG. 2 is a schematic view of a viewing center of a parallax barrier with 2-view 3D image.
Figure 3:
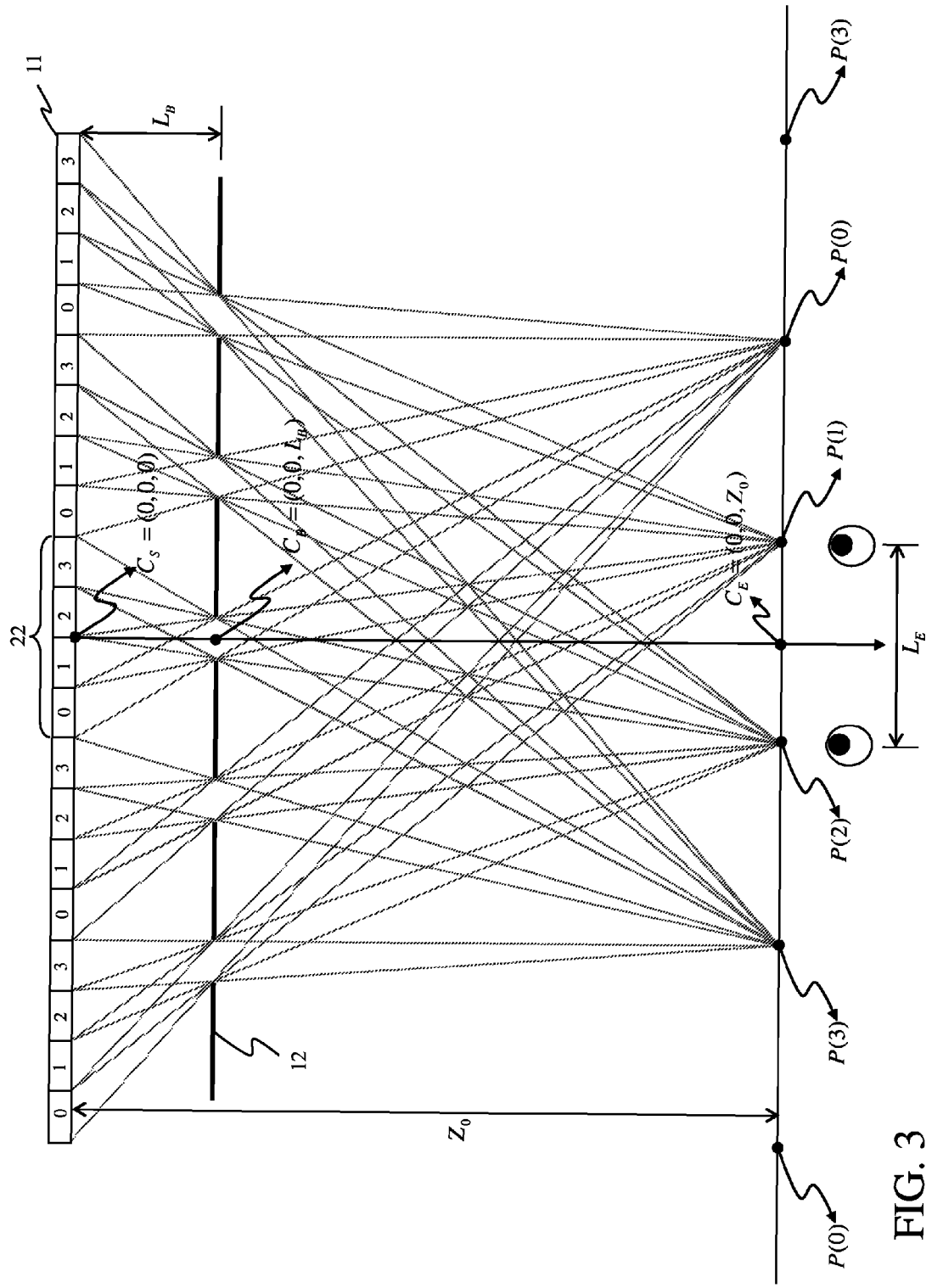
FIG. 3 is a schematic view of a viewing center of a parallax barrier with 4-view 3D image.
Figure 4:
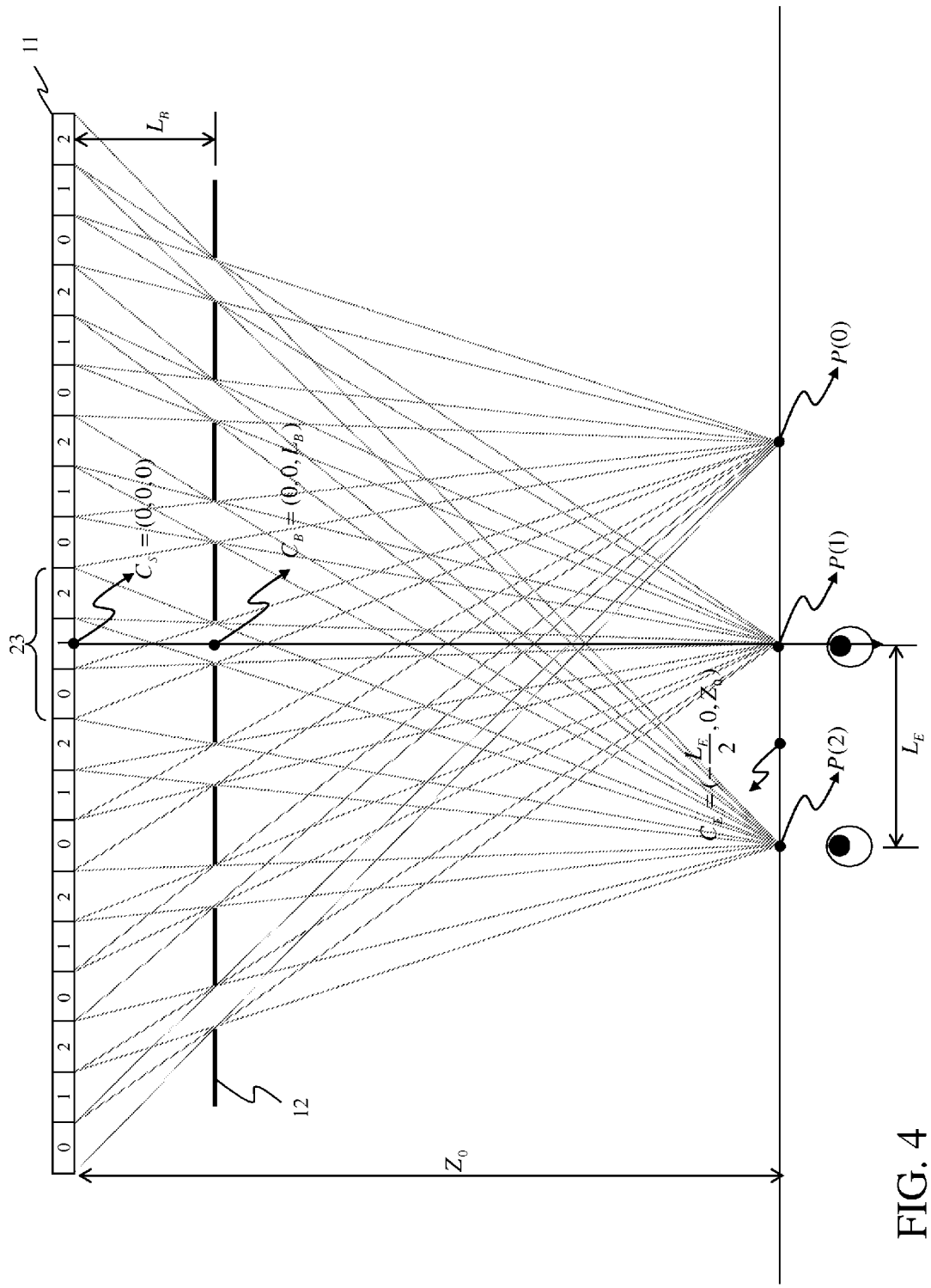
FIG. 4 is a schematic view of a viewing center of a parallax barrier with 3-view 3D image.
Figure 5:
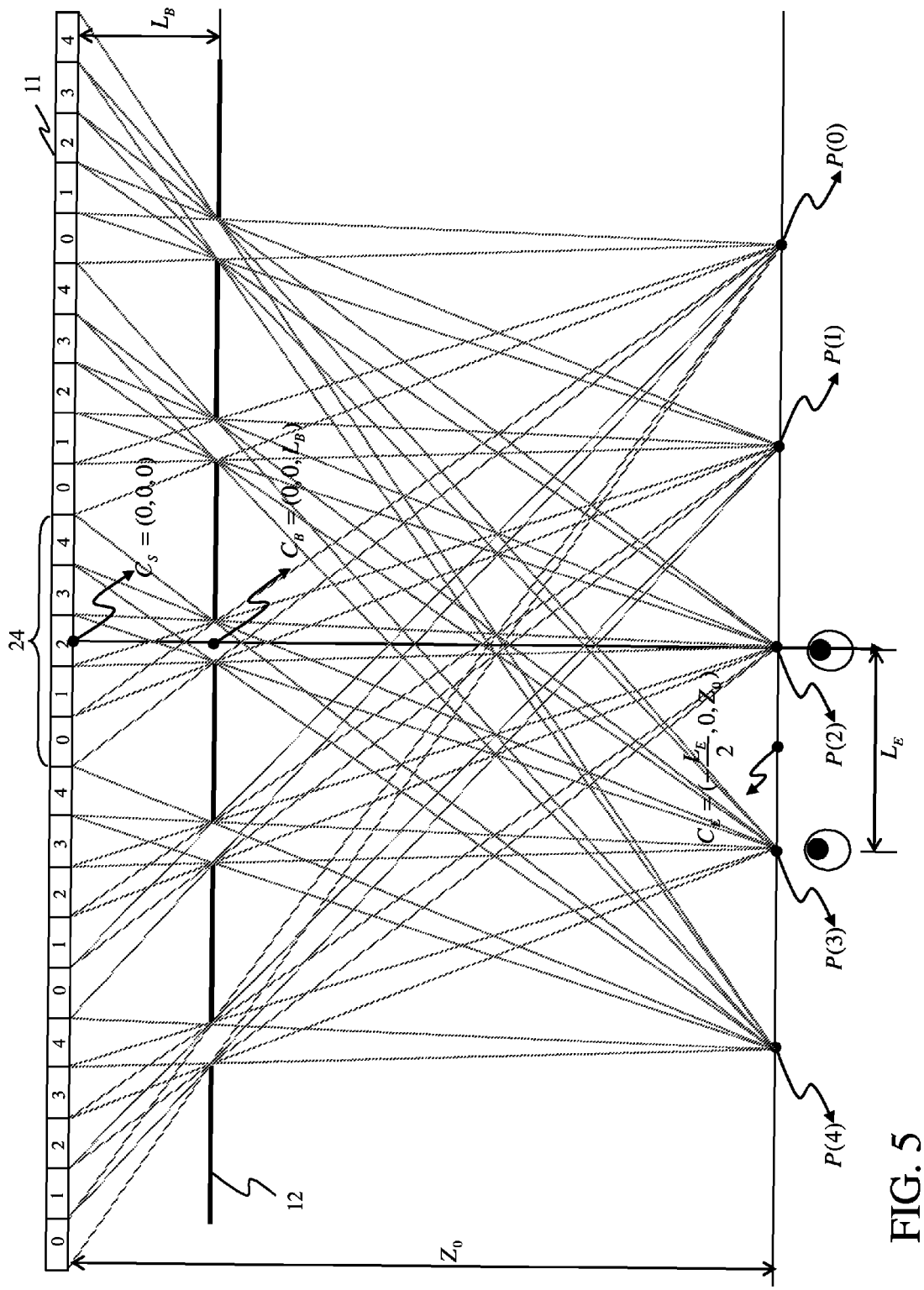
FIG. 5 is a schematic view of a viewing center of a parallax barrier with 5-view 3D image.
Figure 6:
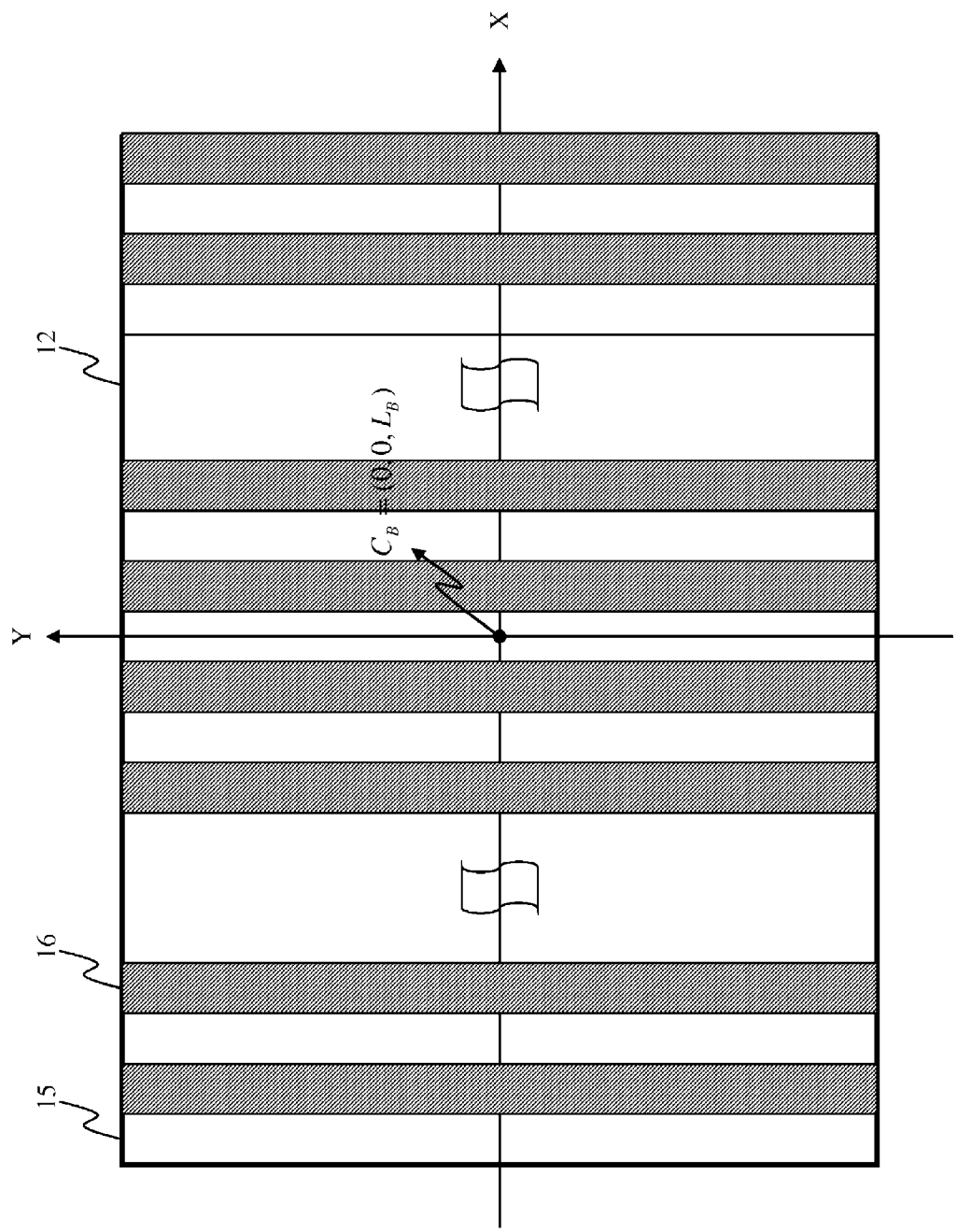
FIG. 6 is a schematic structural view of a conventional vertical strip parallax barrier.
Figure 7:
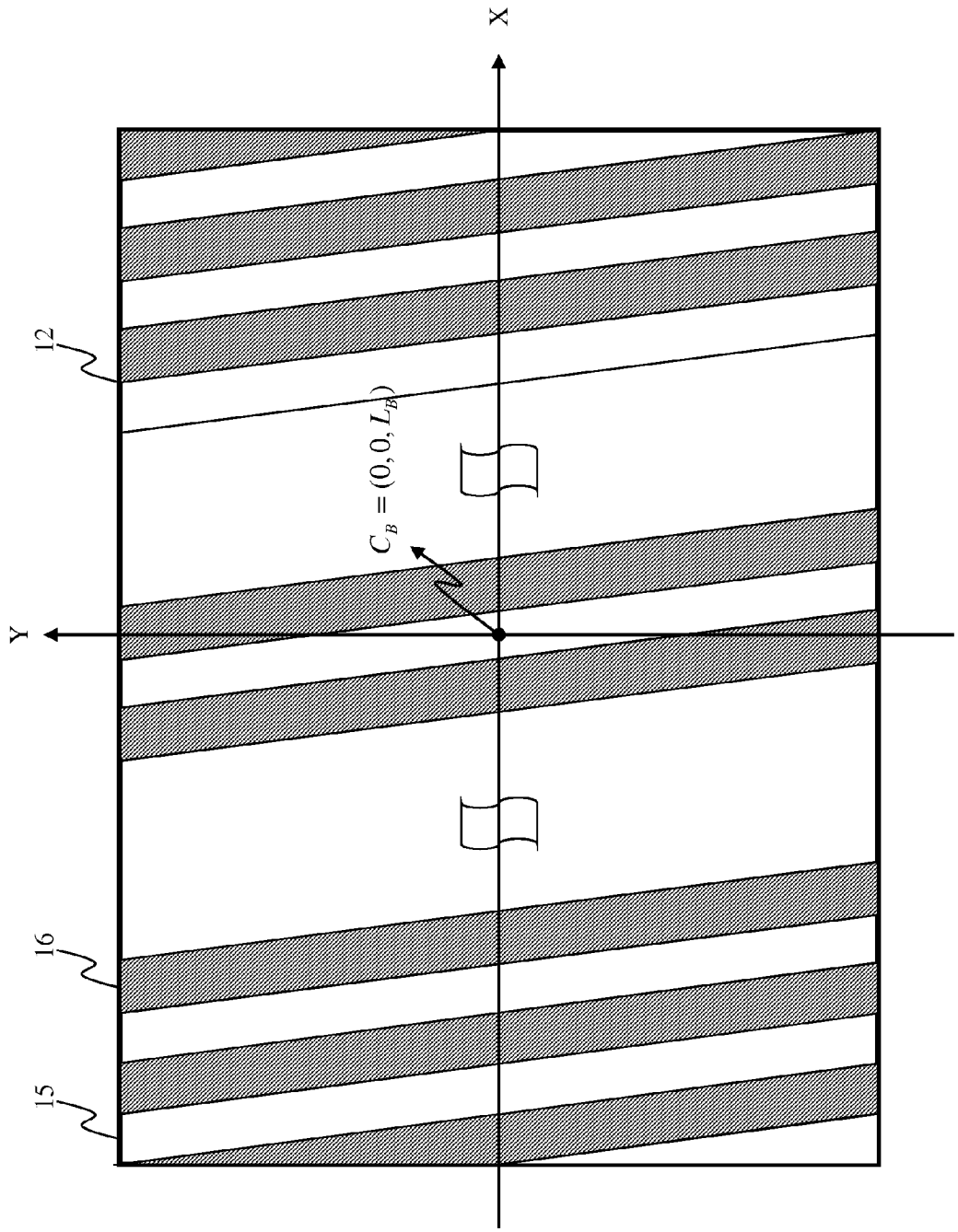
FIG. 7 is a schematic structural view of a conventional slant-and-strip parallax barrier.
Figure 8:
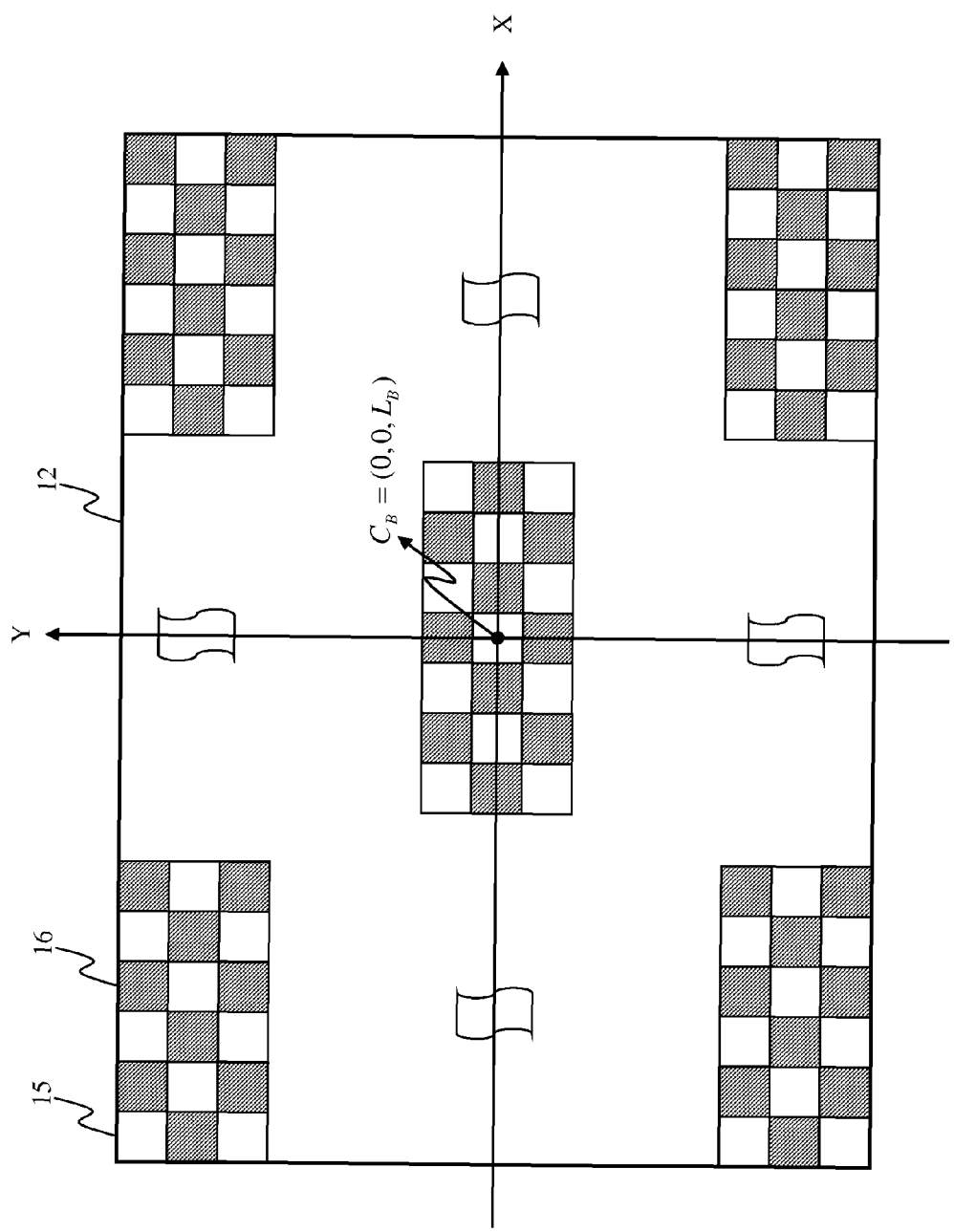
FIG. 8 is a schematic structural view of a conventional slant-and-step parallax barrier.
Figure 9:
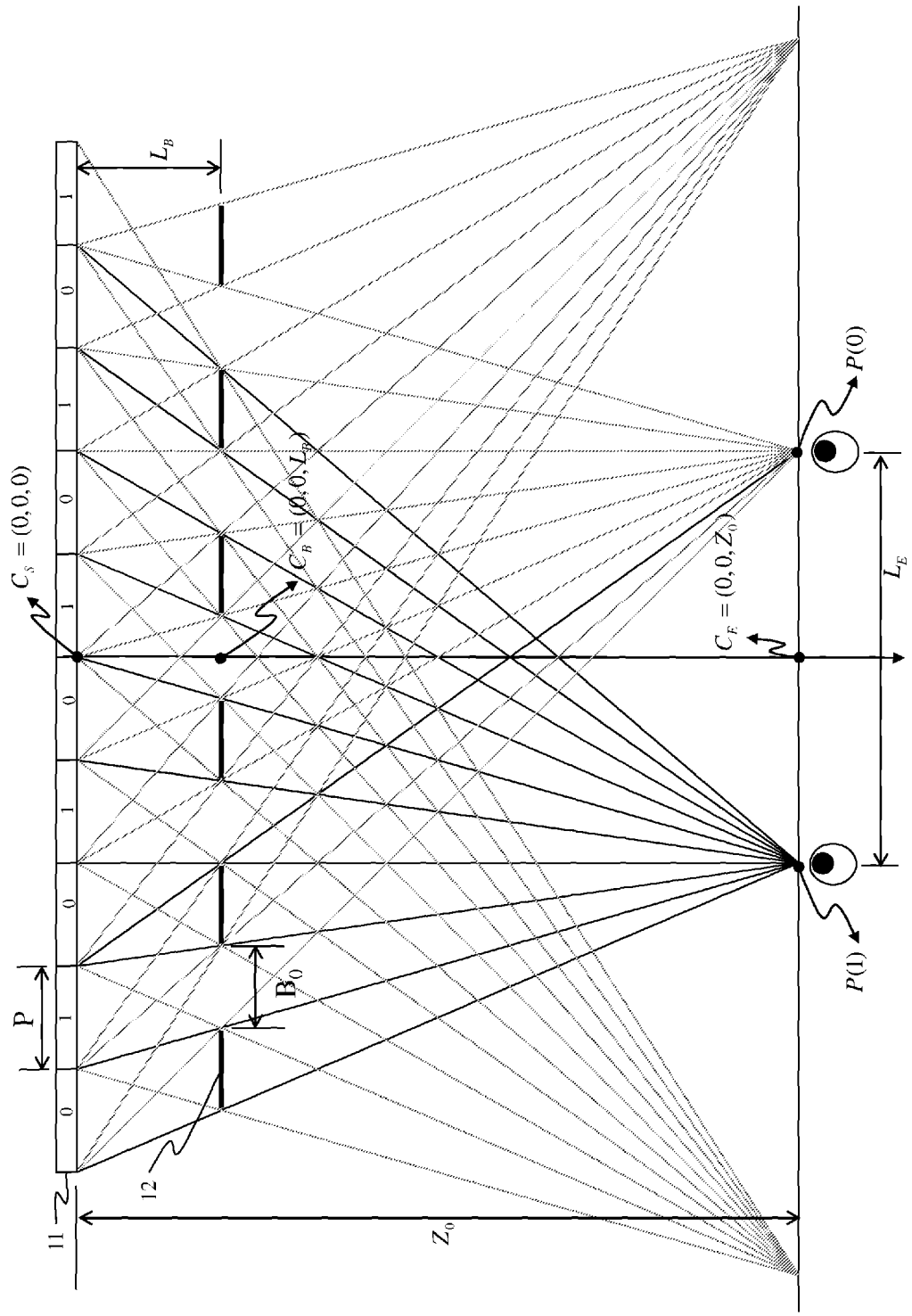
FIG. 9 is a schematic view of a viewing center without offset of a 2-view 3D image display.

FIG. 9 is a schematic view of a viewing center without offset of a 2-view 3D image display. A reference point position of the parallax barrier is consistent with a reference point position of the flat panel display screen. A width of the view combination unit images 0 and 1 is P (that is, a width of a pixel or a sub-pixel), while a width of the opening of the parallax barrier 12 is $B_0$. The plane of the parallax barrier and the plane of the flat panel display screen are in a parallel state, and for Z-axis, no angle rotation occurs between the two planes. When the reference point position of the parallax barrier is consistent with the reference point position of the flat panel display screen, the viewing center $C_E$ and the reference point position $C_S$ of the flat panel display screen can be in a consistent state, that is, on the XY plane, both the $C_E$ and the $C_S$ are located on the coordinate origin (0,0). According to ROC Patent No. 098128986, relations among parameters are as follows:

$$L_E = \frac{P}{P - B_0} B_0 \quad (1)$$

$$Z_0 = \frac{P}{P - B_0} L_B \quad (2)$$

Figure 10:
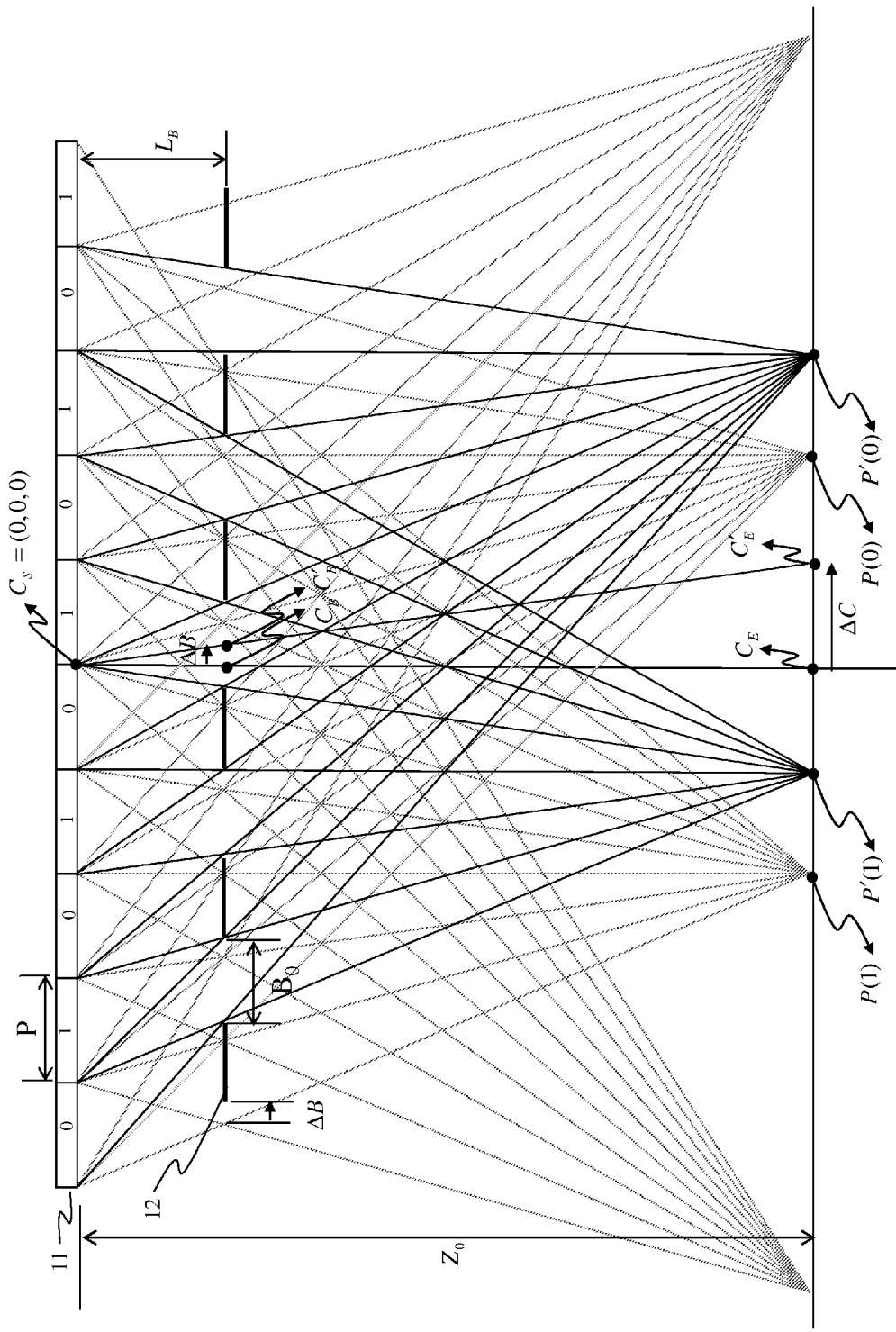
FIG. 10 is a schematic view of a viewing center with offset of a 2-view 3D image display.

FIG. 10 is a schematic view of a viewing center with offset of a 2-view 3D image display. Provided that the parallax barrier 12 is offset by a displacement $\Delta B$ to the right, the displacement $\Delta B$ of the parallax barrier has the following relation:

$$\Delta B = m B_0 \quad (3)$$

where m may be a real number. Referring to FIG. 10, when the parallax barrier 12 is offset by $\Delta B$ to the right, on the optimum viewing distance $Z_0$, the optimum viewing point P(1) and P(0) and the viewing center $C_E$ are all moved by a displacement $\Delta C$ to the right, and are offset to positions of P'(1), P'(0), and C'$_E$ respectively. $\Delta C$ and $\Delta B$ have the following relation:

$$\Delta C = \frac{Z_0}{L_B} \Delta B \quad (4)$$

According to Formulas (1) and (2), the following formula is obtained:

$$\Delta C = \frac{\Delta B}{B_0} L_E \quad (5)$$

Substitute Formula (3) into Formula (5), and the following formula is obtained:

$$\Delta C = m L_E \quad (6)$$

Referring to FIG. 11, $L_E$, $\Delta B$, and $\Delta C$ are calculated according to the widths of the sub-pixels of two currently existing and commonly used flat panel display screens, and with smaller and different values of m.

Additionally, both the structure of the parallax barrier and the arrangement of the view image are characterized in having spatial periodicity distribution, so Formula (6) also reflects the characteristic of spatial periodicity variation. For example, when m=$N_o$ ($N_o$ is a positive odd integer), $\Delta C = N_o L_E$. That is to say, if the parallax barrier 12 is offset by a displacement $N_o B_0$ to the right, the optimum viewing points P(1) and P(0) and the viewing center $C_E$ are all moved by a displacement $N_o L_E$ to the right. Thus, when a deviation between the reference point position $C_B$ of the parallax barrier and the reference point position $C_S$ of the flat panel display screen has a relation of odd number times of $B_0$, and the viewer is located at the original viewing center $C_E$ to view the 3D image, an inversion of left and right images occurs.

When m=$N_e$ ($N_e$ is a positive even integer), $\Delta C = N_e L_E$. That is to say, if the parallax barrier 12 is offset by a displacement $N_e B_0$ to the right, the optimum viewing points P(1) and P(0) and the viewing center $C_E$ are all moved by a displacement $N_e L_E$ to the right. Thus, if the viewer is located at the original viewing center $C_E$ to view the 3D image, the viewer may also view a correct 3D image. In this case, when the deviation between the reference point position $C_B$ of the parallax barrier and the reference point position $C_S$ of the flat panel display screen has a relation of even number times of $B_0$, the viewing center $C_E$ and the center point $C_S$ of the flat panel display screen can be in a consistent state.

Further, for a multi-view image with a number of views exceeding 2, the displacement relation may be a multiple of $nNB_0$, where N is the number of views, and n is an integer. In view of the above, when a relative position between the reference point position $C_B$ of the parallax barrier and the reference point position $C_S$ of the flat panel display screen has a relation of $nNB_0$, and N=an even integer, the viewing center $C_E$ and the reference point position $C_S$ of the flat panel display screen can be in a consistent state; while when N=an odd integer, the viewing center $C_E$ is deviated the distance of $L_E/2$ from the reference point position $C_S$ of the flat panel display screen. Thus, due to the characteristic of spatial periodicity distribution, during practical production and assembly, the relative positions of the $C_B$ and the $C_S$ are not required to be fully consistent, but when the relative positions thereof have a displacement deviation of $nNB_0$, a state that the $C_E$ and the $C_S$ are consistent (for the even number-view) or a state that the $C_E$ is deviated $L_E/2$ from the $C_S$ (for the odd number-view) is achieved.

In addition, according to Formula (5), the following formula is also obtained:

$$\Delta B = \frac{B_0}{L_E} \Delta C \quad (7)$$

Formula (7) presents a tolerable displacement $\Delta B$ of the parallax barrier, that is, the allowed displacement $\Delta B$ of the parallax barrier can be obtained when the displacement $\Delta C$ of the viewing center caused by an assembly error in the X-axis direction is required to be smaller than a certain amount.

Referring to FIG. 11, for a flat panel display screen with P=0.1 mm, if the displacement $\Delta C$ of the viewing center is required to be smaller than about 10 mm, the tolerable displacement $\Delta B$ of the parallax barrier needs to be smaller than about 14 μm; while if $\Delta C$ is required to be smaller than about 5 mm, the tolerable displacement $\Delta B$ of the parallax barrier needs to be smaller than about 7 μm. Thus, the smaller the displacement $\Delta C$ of the viewing center is needed, the higher the required assembly precision is. Further, the smaller the P is, the higher the required assembly precision is for the same $\Delta C$ requirement.

During the mass production, in order to control the tolerable displacement $\Delta B$ of the parallax barrier below a certain amount, high precision alignment and assembly must be performed on the parallax barrier and the flat panel display screen, to achieve the demand of consistent quality. For positioning assembly, a common alignment and assembly technology of the existing industry can be utilized, that is, a high precision alignment table having high resolution microscopy equipment is utilized, and alignment markers are disposed on an assembled object, so that high precision alignment and assembly can be achieved by performing the position measurement and alignment of multiple alignment markers.

Therefore, a method for positioning a viewing center of a parallax barrier according to the present invention mainly includes: disposing a reference point and multiple alignment markers respectively at appropriate places of the parallax barrier and a flat panel display screen, and performing the position measurement and alignment of multiple alignment markers by using an existing high precision alignment table having high resolution microscopy equipment, so as to control the tolerable displacement ΔB of the parallax barrier below a certain amount, and achieve a purpose that the viewing center is consistent with the screen reference point position. Hereinafter, two alignment markers are illustrated as an example.

Figure 12:
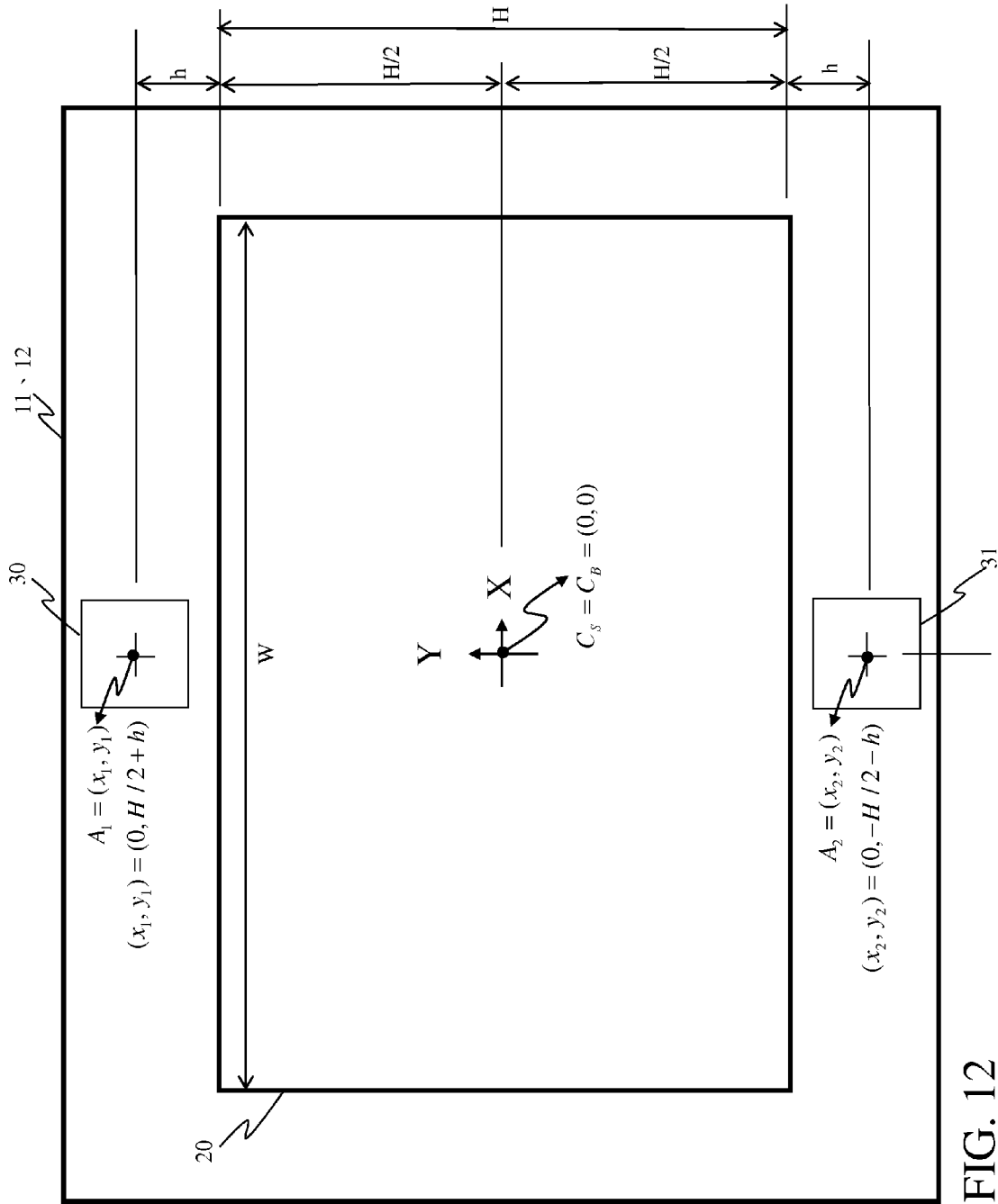
FIG. 12 is a schematic view of a first example of an alignment marker.

FIG. 12 is a schematic view of an alignment marker. Both the flat panel display screen 11 and the parallax barrier 12 have an active area 20. That is to say, for the flat panel display screen 11, RGB sub-pixels for image display are disposed in the active area 20; while for the parallax barrier 12, light-transmissive elements and shielding elements are disposed in the active area 20. In the above method, firstly, a coordinate system XY is set, and the reference point position $C_B$ of the parallax barrier and the reference point position $C_S$ of the flat panel display screen are disposed at an origin (0,0) of the coordinate system XY. Generally, a practical design of the parallax barrier makes a size of the active area of the parallax barrier close to a size of the active area of the flat panel display screen. For the convenience of illustration with the accompanying drawings, the parallax barrier and the flat panel display screen have an active area 20 with the same dimension (W*H) herein. Additionally, a pair of alignment markers 30 and 31 are disposed out of the active area 20, and the center point position $A_1$ and $A_2$ of the alignment marker 30 and 31 are $(x_1,y_1)$ and $(x_2,y_2)$ respectively where both $(x_1,y_1)$ and $(x_2,y_2)$ are preset as known values. Thus, performing angle and position alignment on the center point position $A_1$ and $A_2$ disposed on the flat panel display screen 11 and the parallax barrier 12 respectively is equivalent to performing alignment on the $C_B$ and $C_S$.

Referring to FIG. 12, the $A_1$ and $A_2$ are set at $(x_1,y_1)=(0, H/2+h)$ and $(x_2,y_2)=(0,-H/2-h)$. That is to say, the center point positions $A_1$ and $A_2$ of the alignment markers 30 and 31 are disposed on a vertical line of X=0. Here, h is a distance between the $A_1$, $A_2$ and a boundary of the active area 20.

Figure 13:
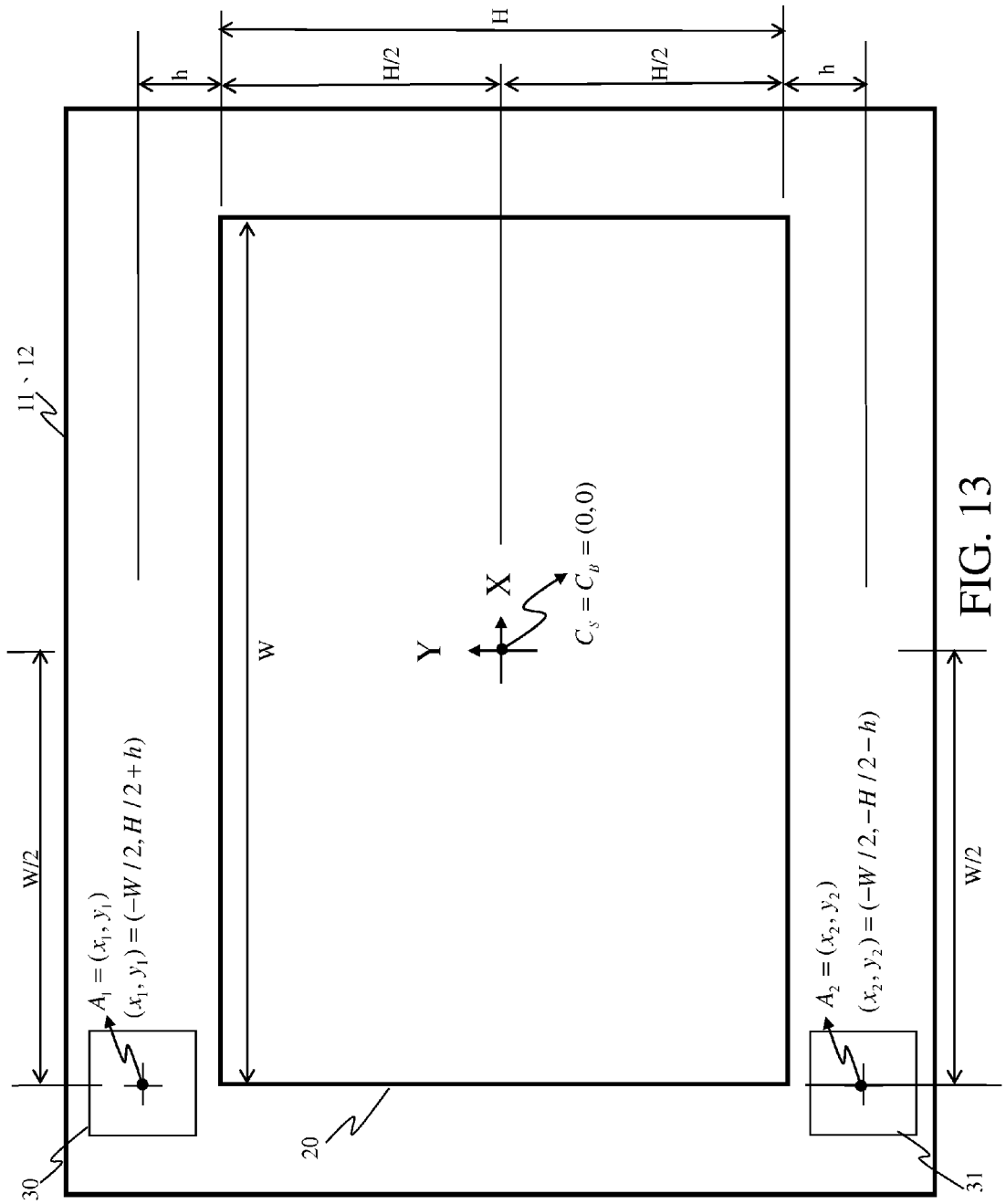
FIG. 13 is a schematic view of a second example of an alignment marker.

Referring to FIG. 13, the $A_1$ and $A_2$ are set at $(x_1,y_1)=(-W/2,H/2+h)$ and $(x_2,y_2)=(-W/2,-H/2-h)$. That is to say, the center point positions $A_1$ and $A_2$ of the alignment markers 30 and 31 are disposed on a vertical line of X=-W/2.

Figure 14:
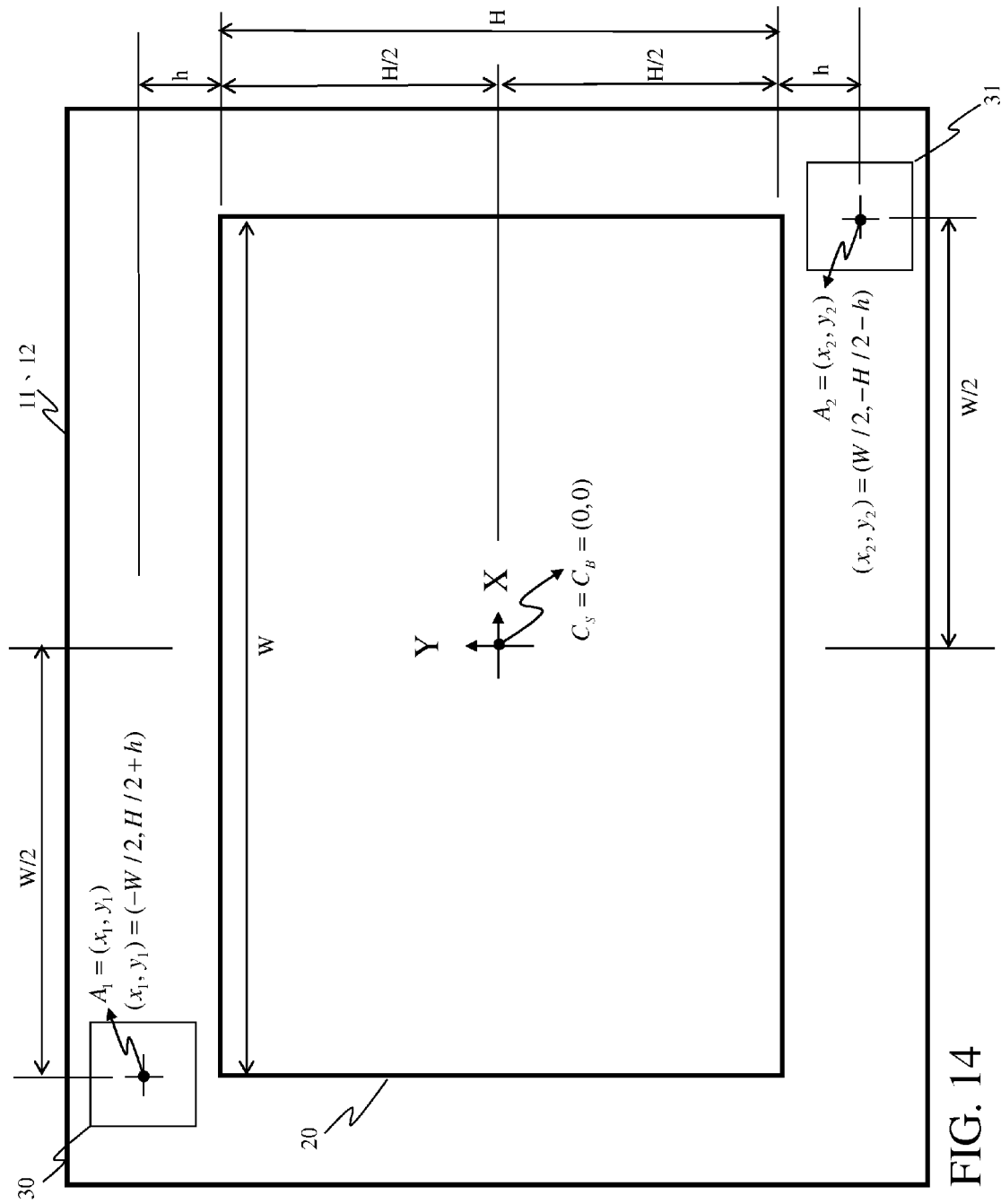
FIG. 14 is a schematic view of a third example of an alignment marker.

Referring to FIG. 14, the $A_1$ and $A_2$ are set at $(x_1,y_1)=(-W/2,H/2+h)$ and $(x_2,y_2)=(W/2,-H/2-h)$. That is to say, the center point positions $A_1$ and $A_2$ of the alignment markers 30 and 31 are disposed at diagonal positions on the flat panel display screen 11 or the parallax barrier 12.

Figure 15:
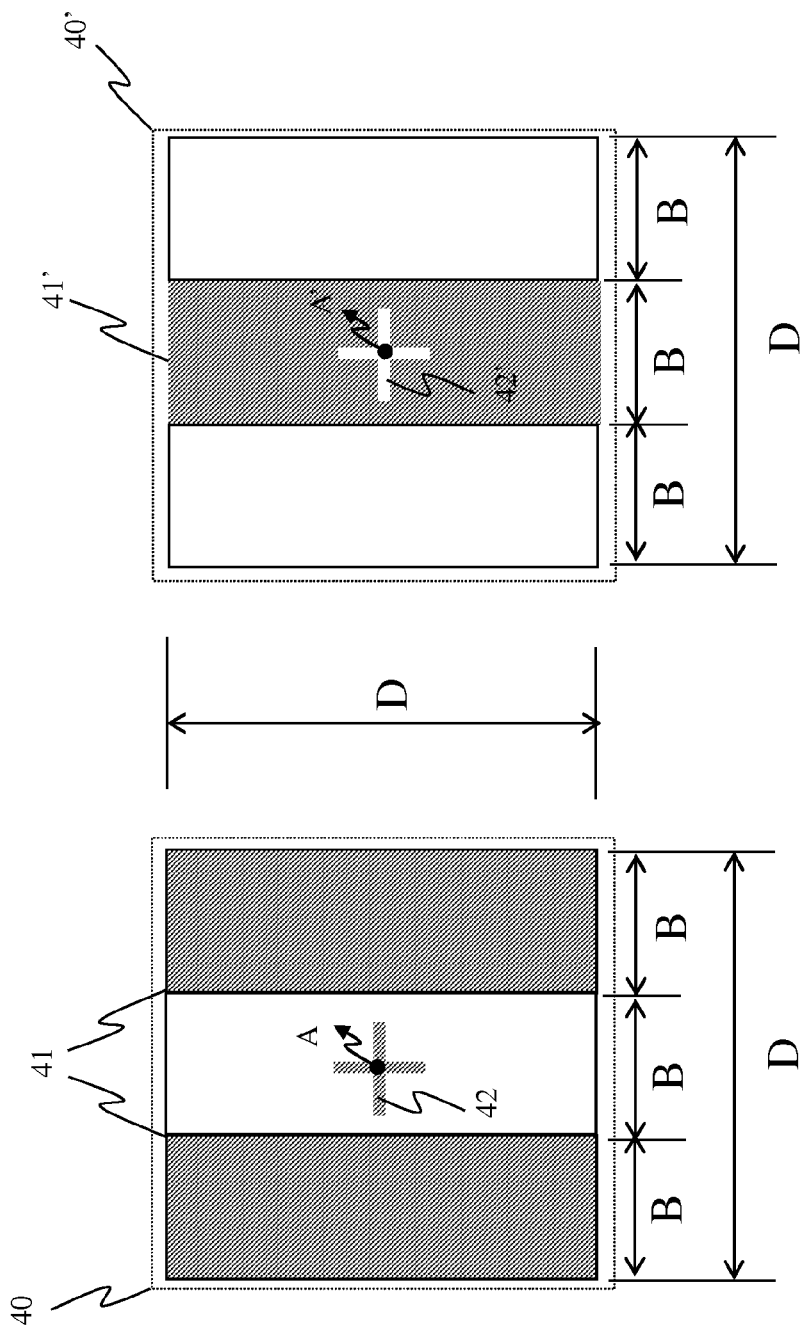
FIG. 15 and FIG. 16 are schematic views of a first exemplary structure of a pair of alignment markers.
Figure 16:
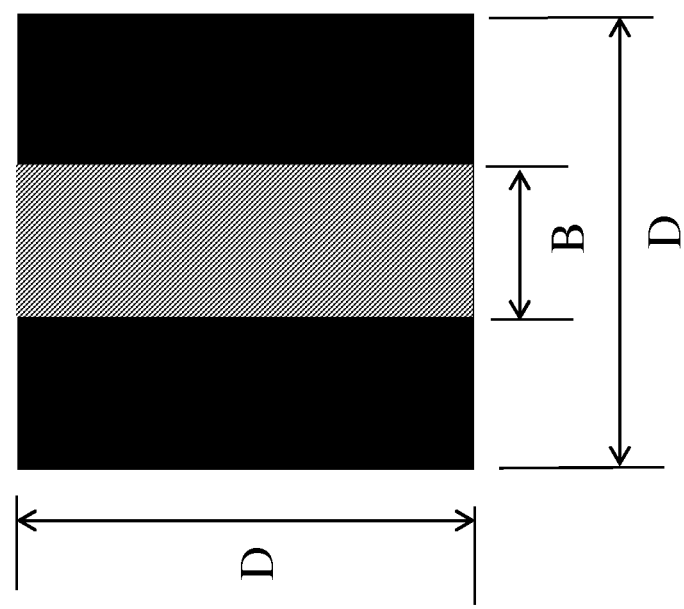
Figure 17:
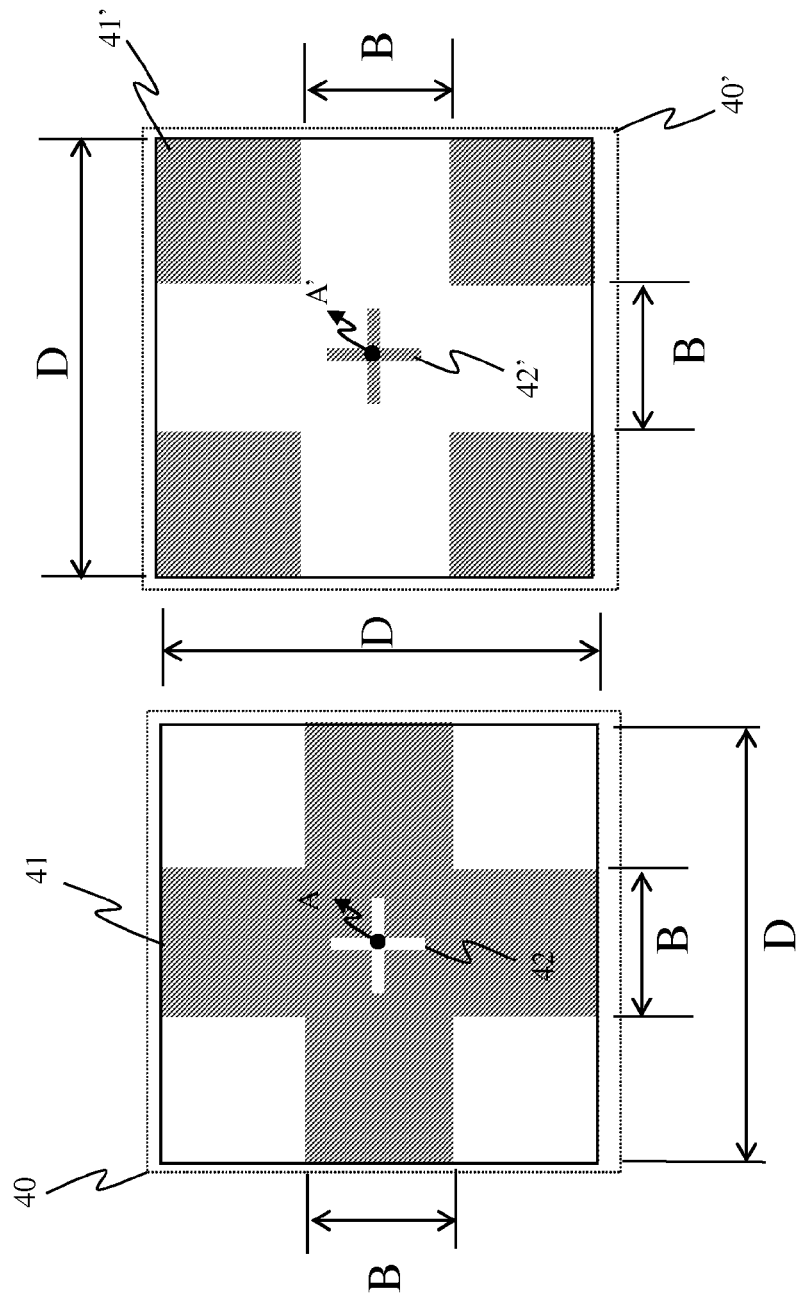
FIG. 17 and FIG. 18 are schematic views of a second exemplary structure of a pair of alignment markers.
Figure 18:
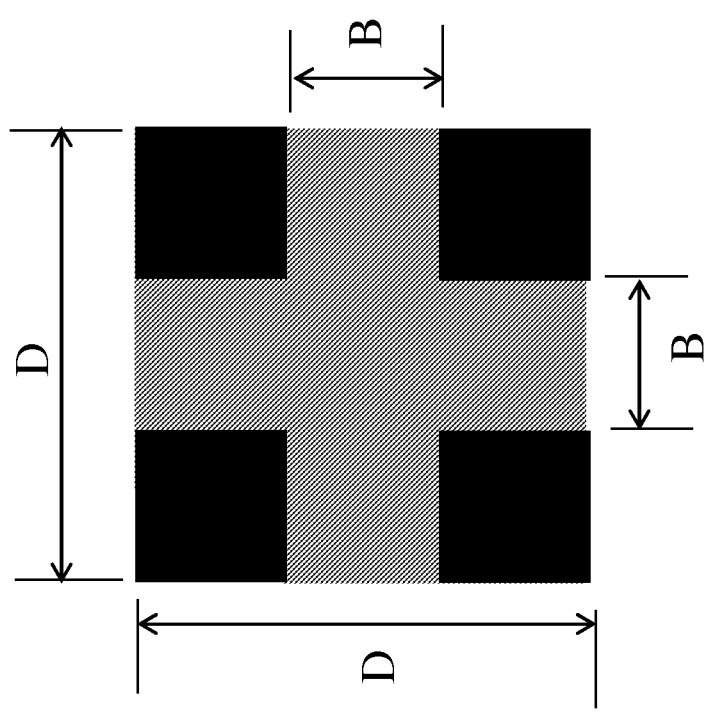
Figure 19:
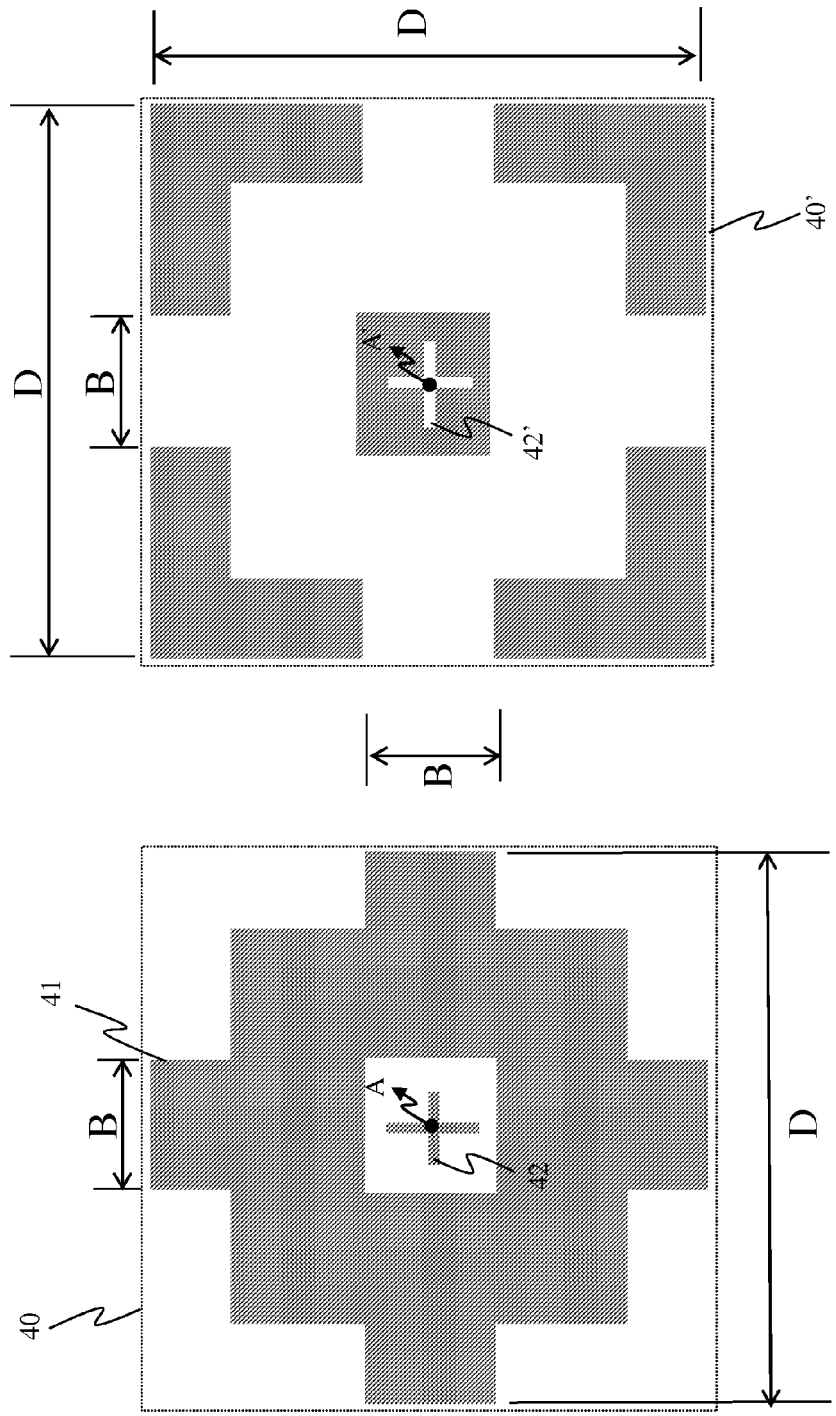
FIG. 19 and FIG. 20 are schematic views of a third exemplary structure of a pair of alignment markers.
Figure 20:
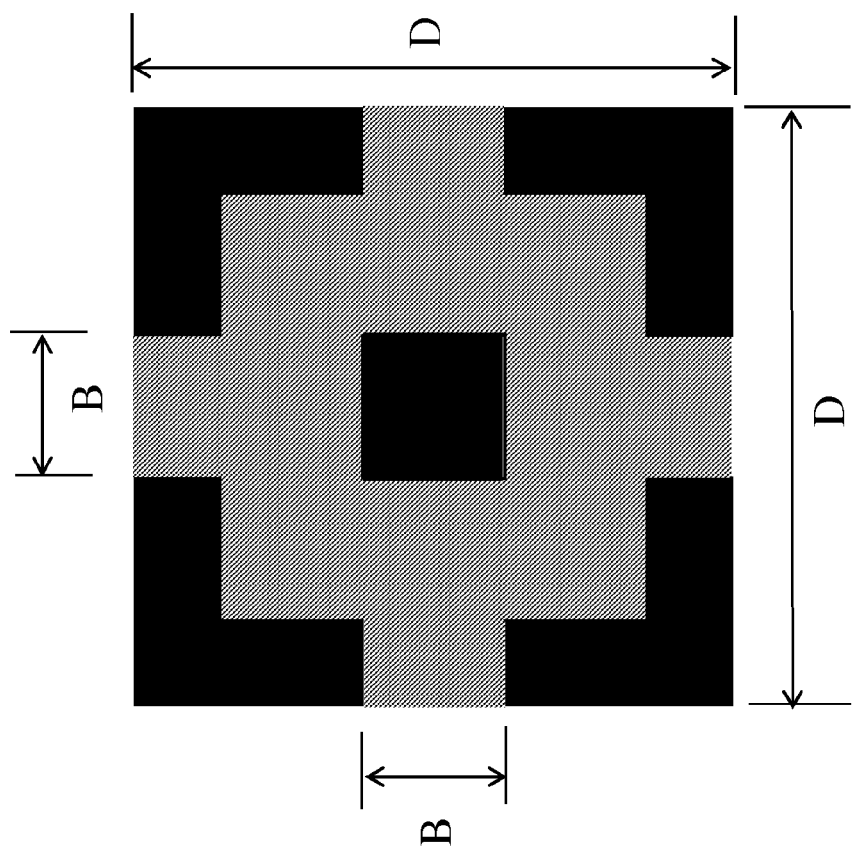

FIG. 15, FIG. 17, and FIG. 19 are schematic structural views of an alignment marker. The alignment marker may be formed of a pair of patterns 40 and 40' with complementary geometrical structures, and the pair of patterns 40 and 40' with the complementary geometrical structures are disposed on the flat panel display screen 11 and the parallax barrier 12 respectively. That is to say, if the pattern 40 with the complementary geometrical structure is disposed on the flat panel display screen 11, the other pattern 40' with the complementary geometrical structure is disposed on the parallax barrier 12, or vice versa. Thus, after the flat panel display screen 11 and the parallax barrier 12 are aligned, the pair of patterns 40 and 40' with the complementary geometrical structures form a complete pattern (such as blocks in FIG. 16, FIG. 18, and FIG. 20). In addition, according to a relative geometrical relation of the complementary patterns 40 and 40', differences of angles and positions can be obtained (this is a conventional technology, and the details thereof will not be described herein again).

FIG. 15, FIG. 17, and FIG. 19 are schematic structural views of various alignment markers. One pattern is set as a positive alignment marker 40, and the other pattern is set as a negative alignment marker 40'. The positive and negative alignment markers 40 and 40' are mainly formed of alignment patterns 41 and 41' and cross lines 42 and 42'. The patterns with the complementary geometrical structures mean that, in the pair of patterns 40 and 40' with the complementary geometrical structures, the alignment patterns 41 and 41' and the cross lines 42 and 42' have the same geometrical structure, but have different optical characteristics, that is, for patterns at the same corresponding position, one pattern has light-transmissive optical characteristic (for example, at a white position), and the other has shielding optical characteristic (for example, at a gray position). Additionally, the pair of patterns 40 and 40' with the complementary geometrical structures have the same dimension (such as a square of D*D, and may also be a rectangle). The alignment patterns 41 and 41' mainly have a basic strip or block structure, and in the basic structure, a length B of at least one side may have a relation of $B=B_0$. Thus, the basic structure on the alignment patterns 41 and 41' is also characterized in having the opening width $B_0$ of the parallax barrier, and provides a reference for alignment.

Figure 21:
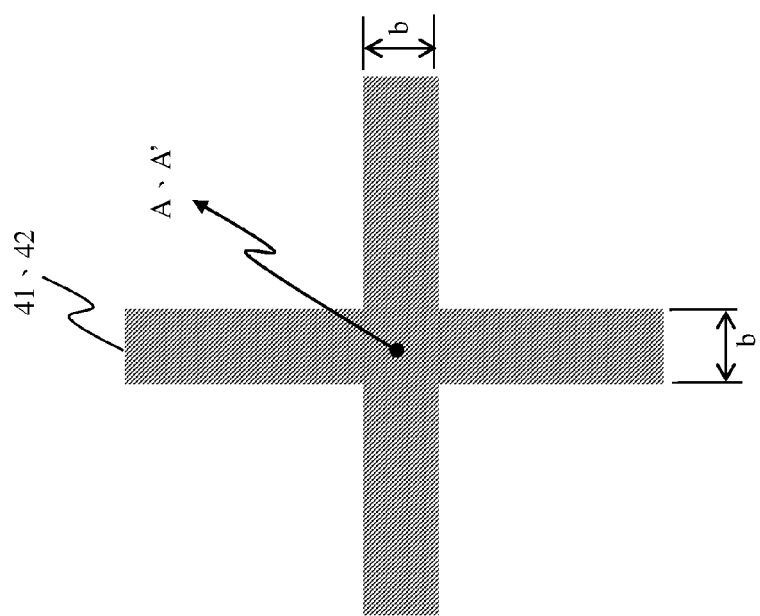
FIG. 21 is a schematic structural view of a cross line.

Referring to FIG. 15, FIG. 17, and FIG. 19, center positions A and A' of cross-points of the cross lines 42 and 42' are set at the center point positions $A_1$ and $A_2$, and respectively have light-transmissive and shielding optical characteristics. Further, referring to FIG. 21, the cross lines 42 and 42' are formed of two lines having a fixed width b, and the line width b may be a black matrix line width between sub-pixels. Thus, the cross lines 42 and 42' also have characteristics of the black matrix line width of the plane of the flat panel display screen, and also provide a reference for alignment.

Although two alignment markers are provided as an example for illustration, for a practical number thereof, more alignment markers with the same known center position can be added at appropriate places of the parallax barrier and planar display elements according to existing demands for a high precision alignment table having high resolution microscopy equipment, so as to improve the efficiency of alignment. Additionally, for existing flat panel display screens produced on a large scale, although alignment markers cannot be added any more, a known position of a sub-pixel position can be used as a reference for alignment, and the efficacy of setting a viewing center at a specific and appropriate position may also be achieved.

In view of the above, a method for positioning a viewing center of a parallax barrier according to the present invention mainly includes: disposing a reference point and multiple alignment markers respectively at appropriate places of the parallax barrier and a flat panel display, and performing the position measurement and alignment of multiple alignment markers by using an existing technology of high resolution microscopy and high precision alignment, so as to control the tolerable displacement ΔB of the parallax barrier below a certain amount, and achieve a purpose that the viewing center is consistent with the screen reference point position.

What is claimed is:

1. A method for positioning a viewing center of a parallax barrier in relation to a reference point of a flat panel display screen, comprising:
   disposing a parallax barrier reference point and multiple alignment markers at predetermined places of the parallax barrier and the flat panel display screen;
   performing position measurement and alignment of the multiple alignment markers using the parallax barrier reference point such that a displacement of the parallax barrier and a displacement of the viewing center of the parallax barrier in relation to the reference point of the flat panel display screen remains below a predetermined threshold; and setting the viewing center of the parallax barrier at a specific position determined from the displacement of the parallax barrier and displacement of the viewing center of the parallax barrier in relation to the reference point of the flat panel display screen;

wherein the multiple alignment markers comprise of first geometrical patterns with first cross lines and second geometrical patterns with second cross lines, where at least one side of the first geometrical patterns and at least one side of the second geometrical patterns are as wide as an opening of the parallax barrier, the first geometrical patterns and the second geometrical patterns are complementary to each other, the first geometrical patterns are on the parallax barrier, and the second geometrical patterns are on the flat panel display for performing the position measurement and alignment in relation to the reference point of the flat panel display screen.

2. The method for positioning the viewing center of the parallax barrier according to claim 1, wherein the parallax barrier is a vertical strip, a slant-and-strip, or a slant-and-step parallax barrier having an active area, comprising multiple light transmissive elements and shielding elements.

3. The method for positioning the viewing center of the parallax barrier according to claim 2, further comprising:
setting the parallax barrier reference point position at a position of the center of one of the light-transmissive elements of the parallax barrier, wherein the parallax barrier reference point position is a geometrical center of the plane of the parallax barrier or a position close to the geometrical center of the plane of the parallax barrier.

4. The method for positioning the viewing center of the parallax barrier according to claim 1, wherein the flat panel display screen has an active area comprising multiple sub-pixels displaying a multi-view image formed of multiple basic units of combined view which consist of the individual view images sequentially arranged from left to right.

5. The method for positioning the viewing center of the parallax barrier according to claim 4, wherein the flat panel display screen reference point position is disposed at a position of the center of the basic unit of combined view, and the position corresponds to a determined approximation of a geometrical center of the plane of the flat panel display screen.

6. The method for positioning the viewing center of the parallax barrier according to claim 1, further comprising:
setting an alignment center point position in the first geometrical patterns for alignment.

7. The method for positioning the viewing center of the parallax barrier according to claim 6, wherein the center point position of the first geometrical patterns for alignment is a known position relative to the reference point position of the parallax barrier and the reference point position of the flat panel display screen.

8. The method for positioning the viewing center of the parallax barrier according to claim 1, further comprising:
forming the first cross lines from two lines having a fixed width;
setting a center position of a cross-point of the first cross lines to a center point position of the first geometrical patterns for alignment; and
defining a line width of the first cross lines having a line width between sub-pixels, which provides a reference for the position measurement and alignment.

9. The method for positioning the viewing center of the parallax barrier according to claim 1, wherein the first geometrical patterns and the second geometrical pattern comprise complementary geometrical structures having different optical characteristics, such that, patterns at corresponding positions of the parallax barrier and the flat panel display screen comprise a first pattern having a light-transmissive optical characteristic, and a second pattern having a shielding optical characteristic.

10. The method for positioning the viewing center of the parallax barrier according to claim 1, further comprising:
forming a complete pattern with the first geometrical patterns and the second geometrical patterns after the flat panel display screen and the parallax barrier are aligned; and
judging differences of a relative angle and a relative position according to a relation of relative positions of the complementary patterns.

11. The method for positioning the viewing center of the parallax barrier according to claim 1, wherein the performing of position measurement and alignment further comprises:
defining the displacement $\Delta B$ of the parallax barrier and the displacement $\Delta C$ of the viewing center in relation to the reference point of the flat panel display screen to have the following relation:

$$\left|B = \frac{B_0}{L_E}\right|C,$$

where $B_0$ is an opening width of the parallax barrier, $L_E$ is the interpupillary distance (IPD); and
defining the interpupillary distance (IPD) $L_E$ and opening width of the parallax barrier $B_0$ to have the following relation:

$$L_E = \frac{P}{P - B_0} B_0,$$

where P is a width of a sub-pixel or pixel of the flat panel display screen.

12. The method for positioning the viewing center of the parallax barrier according to claim 1, further comprising:
setting a value of the displacement $\Delta C$ of the viewing center smaller than 10 mm.

13. The method for positioning the viewing center of the parallax barrier according to claim 1, further comprising:
setting the viewing center of the parallax barrier at essentially a geometrical center of the plane of the flat panel display screen for even number-view display.

* * * * *